United States Patent Office
2,782,172
Patented Feb. 19, 1957

2,782,172

WHITE FACTICE AND ISOCYANATE-MODIFIED POLYESTER COMPOSITION

William L. Bruce, Norrkoping, Sweden, assignor, by mesne assignments, to The Goodyear Tire & Rubber Company, a corporation of Ohio No Drawing. Application January 22, 1953, Serial No. 332,770

6 Claims. (Cl. 260—22)

This invention relates to new compositions of matter. More particularly it relates to synthetic elastomeric materials. Still more particularly it relates to elastomeric isocyanate-modified linear polyesters to which another material has been added in order to improve the physical properties of the cured elastomer.

The particular elastomeric materials used in the present invention are those described in co-pending applications Serial Numbers 187,696 filed September 29, 1950 now United States Patent 2,625,532; 305,914 filed August 22, 1952; 307,900 filed September 4, 1952; and 312,161 filed September 29, 1952 now United States Patent 2,625,535.

These materials, which will be further described below, will be hereinafter referred to as elastomeric isocyanate-modified linear polyesters.

It has been observed that elastomeric isocyanate-modified linear polyesters are subject to thermal degradation much as natural rubber reverts to a soft, tacky state when subjected to excessive cure. It is therefore an object of this invention to improve the thermal stability of the elastomeric isocyanate-modified linear polyesters. Another object is to improve the physical properties of the cured material. Other objects will appear as the description proceeds.

While each class of elastomeric isocyanate-modified linear polyesters has been fully described in the applications referred to above, the general chemical reactions involved in their preparation may be represented by the following illustrations in which R, R' and R" denote divalent organic radicals.

PREPARATION OF POLYESTER (1)

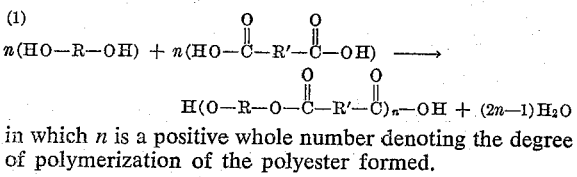

in which $n$ is a positive whole number denoting the degree of polymerization of the polyester formed.

PREPARATION OF POLYESTERAMIDE (2)

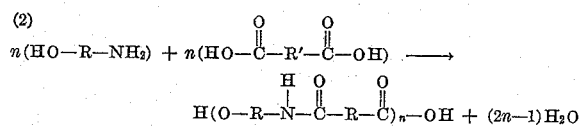

PREPARATION OF DIISOCYANATE-MODIFIED POLYESTER (3)

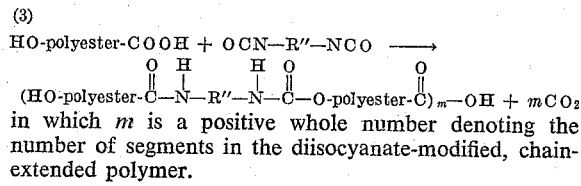

in which $m$ is a positive whole number denoting the number of segments in the diisocyanate-modified, chain-extended polymer.

PREPARATION OF DIISOCYANATE-MODIFIED POLYESTERAMIDE (4)

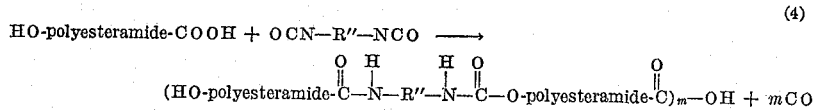

in which $m$ is a positive whole number denoting the number of segments in the diisocyanate-modified, chain-extended polymer.

PREPARATION OF DIISOCYANATE-MODIFIED INTERPOLYMERS (5)

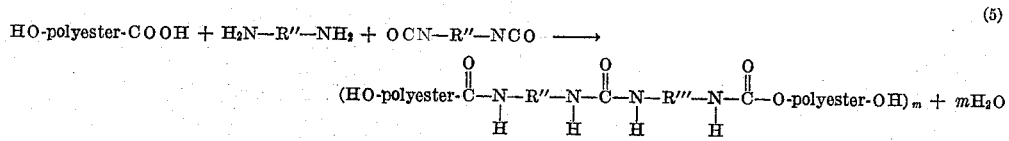

(6)

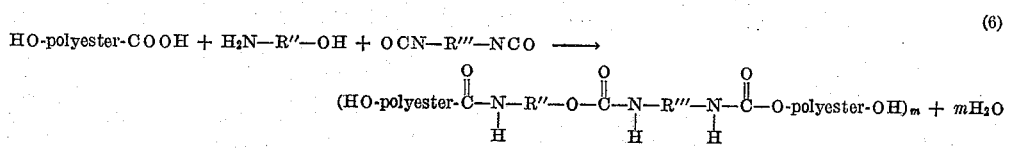

(7)

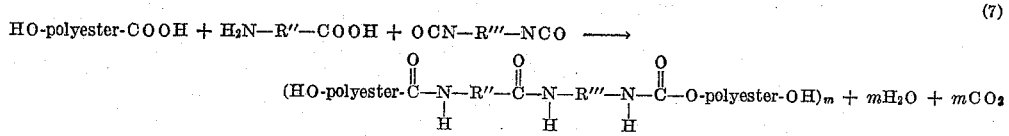

in which R" and R''' represent divalent organic radicals and $m$ represents a positive whole number denoting the number of segments in the modified chain-extended interpolymer.

Equations 3, 4, 5, 6 and 7 represent the reactions which may take place in forming the uncured elastomeric polymers according to the limitations as to acid number, hydroxyl number, amino groups, bifunctional additives, and amount of particular diisocyanate used in their preparation, described in our copending applications referred to above.

The curing or cross-linking of the uncured polymers takes place as the result of reaction between the —NCO groups in the curing agent and the reactive hydrogens in certain groups present in the chain of the extended polymer and certain terminal groups at the ends of the chain-extended units. The terminal groups include, of course, hydroxyl, carboxyl, and amino radicals. The groups along the chain include the groups formed by reaction between an —NCO group and a carboxyl, hydroxyl, or amino group, and may be represented as a substituted amide linkage

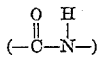

a carbamic radical

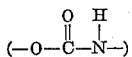

and a ureylene radical

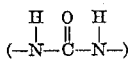

respectively. Each of these groupings has at least one active hydrogen available for reaction with the —NCO group of the polyisocyanate used to effect a cure.

The elastomeric diisocyanate-modified linear polyesters described in the co-pending applications referred to above may be grouped in four general classes.

First, the reaction product of (1) a polyester or polyesteramide prepared from at least one dibasic carboxylic acid and at least one glycol, and/or at least one amino alcohol, and/or at least one diamine; the number of hydrogen-bearing amino groups being present in an amount not to exceed 7.5% of the total hydroxyl and hydrogen-bearing amino groups present, the polyester or polyesteramide having a hydroxyl number from 40 to 100 (the preferred range is from 50 to 60) and an acid number from 0 to 7; and (2) at least one diisocyanate selected from the group consisting of 4,4'-diphenyl diisocyanate; 4,4'-diphenylene methane diisocyanate, dianisidine diisocyanate; 4,4'-tolidine diisocyanate; 1,5-naphthalene diisocyanate; 4-4'-diphenyl ether diisocyanate, and p-phenylene diisocyanate, the diisocyanate being used in an amount ranging from 0.70 to 0.99 (the preferred range is from 0.90 to 0.99) mols per mol of polyester or polyesteramide.

Second, the reaction product of (1) a polyester or polyesteramide prepared from at least one dibasic carboxylic acid, and at least one glycol and/or at least one amino alcohol and/or at least one diamine, the number of hydrogen-bearing amino groups present being in an amount not to exceed 30% of the total hydroxyl and hydrogen-bearing amino groups present, the polyester or polyesteramide having a hydroxyl number from 30 to 140 (the preferred range is from 50 to 60) and an acid number from 0 to 12; and (2) at least one tolylene diisocyanate, the diisocyanate being used in an amount ranging from 0.85 to 1.10 (a preferred range is from 0.90 to 1.00) mols per mol of polyester or polyesteramide.

Third, the reaction product resulting from the reaction of a mixture comprising (1) a polyester prepared from bifunctional ingredients including at least one dibasic carboxylic acid containing at least three carbon atoms, and at least one glycol, said polyester having a hydroxyl number from 30 to 140 (the preferred range is from 50 to 60) and an acid number from 0 to 12; (2) at least one bifunctional additive consisting of diamines, amino alcohols, dicarboxylic acids, hydroxy carboxylic acids, amino carboxylic acids and the ureas, guanidines, and thioureas containing a primary amino group, said bifunctional additive being used in an amount such that the total number of —NH2 and —COOH equivalents present in said bifunctional reactant shall be from 0.06 to 0.24 equivalents per mol of polyester, and (3) at least one tolylene diisocyanate, the diisocyanate being used in an amount equal to the sum of from 0.85 mols to 1.10 (a preferred range is from 0.90 to 1.00) mols of diisocyanate per mol of polyester plus the molar amount of diisocyanate equivalent to the mols of said bifunctional additive used.

Fourth, the reaction product resulting from the reaction of mixture comprising (1) a polyester prepared from bifunctional ingredients including at least one dibasic carboxylic acid containing at least three carbon atoms and at least one glycol, said polyester having a hydroxyl number between 40 and 100 (the preferred range is from 50 to 60) and an acid number from 0 to 7; (2) at least one bifunctional additive selected from the group consisting of diamines, amino alcohols, dicarboxylic acids, hydroxy carboxylic acids, amino carboxylic acids, and the ureas, guanidines, and thioureas containing a primary amino group, said bifunctional additive being used in an amount such that the total number of —NH2 and —COOH equivalents present in said bifunctional reactant shall be from 0.06 to 0.48 equivalent per mol of polyester, and (3) at least one diisocyanate selected from the group consisting of 4,4'-diphenyl diisocyanate; 4,4'-diphenylene methane diisocyanate; 4,4'-tolidine diisocyanate, dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mol to 0.99 (the preferred range is 0.90 to 0.99) mol of diisocyanate per mol of polyester plus the molar amount of diisocyanate equivalent to the mols of bifunctional additive used.

Listed below are the reactants used to form some preferred linear polyesters and polyesteramides which, when prepared and subsequently modified by a diisocyanate and, optionally, a bifunctional additive in accordance with the appropriate limitations indicated in the description of the four types of synthetic elastomers, will produce elastomeric product.

1. Ethylene glycol plus adipic acid.
2. Propylene glycol 1,2 plus adipic acid.
3. Ethylene glycol (80 mol percent), propylene glycol 1,2 (20 mol percent) plus adipic acid.
4. Ethylene glycol (80 mol percent), propylene glycol 1,2 (20 mol percent) plus azelaic acid.
5. Ethylene glycol (80 mol percent), propylene glycol 1,2 (20 mol percent) plus sebacic acid.
6. Ethylene glycol (80 mol percent), propylene glycol 1,2 (20 mol percent) plus dilinoleic acid (20 mol percent), adipic acid (80 mol percent).
7. Ethylene glycol (80 mol percent), glycerine monoethyl ether (20 mol percent) plus adipic acid.
8. Ethylene glycol (80 mol percent), butylene glycol 1,4 (20 mol percent) plus adipic acid.
9. Ethylene glycol (80 mol percent), propylene glycol 1,3 (20 mol percent) plus adipic acid.
10. Ethylene glycol (80 mol percent), pentane diol 1,5 (20 mol percent) plus adipic acid.
11. Ethylene glycol (80 mol percent), glycerine monoisopropyl ether (20 mol percent) plus adipic acid.
12. Ethylene glycol (80 mol percent), propylene glycol 1,2 (from 18 to 5 mol percent), ethanol amine (from 2 to 15 mol percent), plus adipic acid.
13. Ethylene glycol (80 mol percent), propylene glycol 1,2 (20 mol percent) plus maleic acid (from 3 to 6 mol percent) adipic acid (from 97 to 94 mol percent).
14. Ethylene glycol (80 mol percent), propylene glycol 1,2 (from 19 to 17 mol percent), piperazine (from 1 to 3 mol percent) plus adipic acid.
15. Ethylene glycol (80 mol percent), propylene glycol 1,2 (from 18 to 5 mol percent), dihydroxyethyl aniline (from 2 to 15 mol percent) plus adipic acid.
16 Ethylene glycol (80 mol percent), diethylene glycol (20 mol percent) plus adipic acid.
17. Ethylene glycol (from 90 to 10 mol percent), propylene glycol 1,2 (from 10 to 90 mol percent) plus adipic acid.
18. Ethylene glycol (from 90 to 10 mol percent), propylene glycol 1,2 (from 10 to 90 mol percent) plus azelaic acid.

The diisocyanates which are preferred when used to form the unvulcanized modified polyesters and polyesteramides, are 4,4'-diphenyl diisocyanate; 1,5-naphthalene diisocyanate; 4,4'-diphenylene methane diisocyanate, and the meta tolylene diisocyanates, such as 2,4 and 2,6-tolylene diisocyanate. If meta tolylene diisocyanate is to be used, a convenient method of adding it is in the form of one of its dimers such as the dimer of 2,4-tolylene diisocyanate of the following formula:

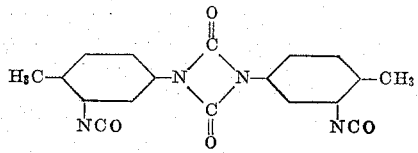

The dimer is less toxic than the monomeric material.

Of the first class of elastomeric polymers described above, those of particular interest are the rubber-like polymers resulting from polyethylene adipate modified by 4,4'-diphenyl diisocyanate; 1,5-naphthalene diisocyanate; 4,4'-diphenylene methane diisocyanate, or mixtures thereof, polypropylene 1,2 adipate modified by 4,4'-diphenyl diisocyanate; 1,5-naphthalene diisocyanate; 4,4'-diphenyl methane diisocyanate, or mixtures thereof; polyethylene (80 mol percent) propylene 1,2 (20 mol percent) adiphate modified by 4,4'-diphenyl diisocyanate; 1,5-naphthalene diisocyanate; 4,4'-diphenyl methane diisocyanate, or mixtures thereof; polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof; and polyethylene (80 mol percent) propylene 1,2 (from 19 to 17 mol percent) piperazine (from 1 to 3 mol percent) adipate modified by 4,4'-diphenyl diisocyanate; 1,5-naphthalene diisocyanate; 4,4'-diphenylene methane diisocyanate, or mixtures thereof. These polymers, when cured, have been found to possess outstanding physical properties.

Of the second class of elastomeric polymers described above, those of particular interest are the rubber-like polymers resulting from polyethylene adipate modified by a meta tolylene diisocyanate; polypropylene 1,2 adipate modified by a meta tolylene diisocyanate; polyethylene (80 mol percent) propylene 1,2 (20 mol percent) adipate modified by a meta tolylene diisocyanate polyethylene (80 mol percent) propylene 1,2 (20 mol percent) azelate modified by a meta tolylene diisocyanate; and polyethylene (80 mol percent) propylene 1,2 (from 19 to 17 mol percent) piperazine (from 1 to 3 mol percent) adipate modified by a meta tolylene diisocyanate. Mixtures of meta tolylene diisocyanates such as mixtures of 2,4- and 2,6-tolylene diisocyanates may also be used.

Of the third class of elastomeric interpolymers described above, those of particular interest are the rubber-like materials resulting from (1) Polyethylene adipate modified by a meta tolylene diisocyanate, and by ethylene diamine, tetramethylene diamine, hexamethylene diamine, ethanol amine, benzidine; 4,4'-diamino diphenyl methane or mixtures thereof.

(2) Polypropylene 1,2-adipate modified by a meta tolylene diisocyanate, and by ethylene diamine, tetramethylene diamine, hexamethylene diamine, ethanol amine, benzidine, 4,4'-diamino diphenyl methane or mixtures thereof.

(3) Polyethylene (80 mol percent) propylene 1,2 (20 mol percent) adipate modified by a metal tolylene diisocyanate, and by ethylene diamine, tetramethylene diamine, hexamethylene diamine, ethanol amine, benzidine; 4,4'-diamino diphenyl methane or mixtures thereof.

(4) Polyethylene (80 mol percent) propylene 1,2 (20 mol percent) azelate modified by a meta tolylene diisocyanate, and by ethylenediamine, tetramethylene diamine, hexamethylene diamine, ethanol amine, benzidine; 4,4'-diamine diphenyl methane or mixtures thereof.

Mixtures of meta-tolylene diisocyanates such as mixtures of 2,4- and 2,6-tolylene diisocyanates may also be used.

Of the fourth class of elastomeric interpolymers described above, those of particular interest are the rubber-like materials resulting from (1) Polyethylene adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(2) Polypropylene 1,2 adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(3) Polyethylene (80 mol percent) propylene 1,2 (20 mol percent) adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(4) Polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

The amount of polyisocyanate required to cure or cross-link the chain-extended polymers and interpolymers described above must be held within certain limits. Any organic diisocyanate, polyisocyanate or mixtures of diisocyanates, polyisocyanates, or both, may be added in this step. When curing the polymers of the first and second classes, enough polyisocyanate must be added to the polymer so that the total amount of —NCO equivalents, including that added in the formation of the polymer, shall be from 2.80 to 3.20 equivalents per mol of polyester or polyesteramide. When curing the interpolymers of the third and fourth classes, enough polyisocyanate must be added to the interpolymer so that the total amount of —NCO equivalents, including that added in the formation of the interpolymer, shall be equal to the sum of from 2.80 to 3.20 equivalents per mol of polyester plus twice the molar amount of bifunctional additive used in preparing the interpolymer. Smaller amounts of polyisocyanate added to cure the polymer or interpolymer will result in an under-cured product. The use of greater amounts is a waste of material with no improved properties in the cured product and in some cases produces a cured material having properties more resinous than rubber-like. If a triisocyanate or tetraisocyanate is used in place of a diisocyanate to effect a cure, not as much material, on a mol basis, need be used, since the curing or cross-linking of the linear molecules depends upon the number of —NCO groups present in the curing agent. For example, if 0.50 mol of a diisocyanate gives a satisfactory cure of a diisocyanate-modified polyester or polyesteramide, the use of approximately 0.25 mol of a tetraisocyanate will result in a similar state of cure.

The actual curing of the elastomeric polymer is accomplished by methods familiar to those skilled in the art. The time and temperature required to effect the best cure for any particular material will, of course, vary as in the case with the curing of conventional natural rubber compounds. The cure for best results should be accomplished by the use of dry heat since exposure of the elastomeric polymer to hot water or steam results in a partial degradation of the cured material.

The following examples, in which parts are by weight, are illustrative of the preparation of a polyester, an elastomeric diisocyanate-modified linear polyester, and the mixing and curing of the modified polyesters according to the teachings of this invention.

*Example 1.—Preparation of a typical polyester*

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm. and nitrogen being bubbled through the melt. After 23½ hours a soft white waxy solid was obtained. Determinations showed the acid number to be 3.5 and the hydroxyl number to be 58.6.

*Example 2.—Preparation of the diisocyanate-modified polymer*

A quantity of polyester was prepared from adipic acid, ethylene glycol, and propylene 1,2 glycol according to the general method and in substantially the same ratios as shown in Example 1. This polyester had an acid number of 3.1 and a hydroxyl number of 55.6. After heating 2270 parts of this polyester in a steam-heated Baker-Perkins mixer to 120° C., 4,4'-diphenyl diisocyanate (280.3 parts of 95.7% purity or 0.96 mols per mol of polyester) was added. After ten minutes of mixing the hot melt was poured into a Carnauba wax coated tray and baked for 8 hours at 130° C. The resulting polymer had excellent processing characteristics on a rubber mill. Tests showed the following physical properties—intrinsic viscosity 1.69, percent gel 3.9, plastic flow (1500 p. s. i.—212° F.) 85 seconds per inch, and softening point 186° C.

*Example 3.—Preparation of the diisocyanate-modified polymer*

A quantity of polyester was prepared from adipic acid, ethylene glycol, and propylene, 1,2 glycol according to the general method and in substantially the same ratios as shown in Example 1. This polyester had an acid number of 3.1 and a hydroxyl number of 55.6. After heating 200 parts of this polyester to 120° C. in an iron kettle, 2,4-tolylene diisocyanate (20.11 parts of 99.7% purity or 1.10 mols of diisocyanate per mol of polyester) was added. After 15 minutes of mixing, the material was poured into a waxed aluminum tray and baked for 8 hours at 120° C. The resulting polymer had excellent processing characteristics on a rubber mill.

The diisocyanate-modified polyesters prepared according to Examples 2 and 3 will, when cured, show a tendency to degrade when subjected to prolonged heating. According to this invention a means has been discovered to minimize this degeneration which involves adding to the uncured rubber a material selected from the group consisting of white factice, chlorinated paraffin, and polychloroprene. These materials produce various beneficial effects upon the properties of the uncured and cured synthetic elastomers.

"White factice" is a term used to define the product of the action of sulfur chloride on vegetable oils such as linseed, castor, colza, and rape oil, and fish oils such as herring oil. The term "white factice" as used herein is not used in the sense of describing the color of the factice but rather in the sense of denoting its chemical composition, i. e., a product resulting from the action of sulfur chloride on vegetable or fish oils. It is to be understood that the "brown factices," made from similar oils but using sulfur in place of sulfur chloride, are not to be included in the term "white factice" since brown factices do not produce the described beneficial effects upon the synthetic elastomers.

White factice, when used in a range of from 0.50 to 30 parts by weight per 100 parts of synthetic elastomer, produces a cured product which has higher tensile strength, higher abrasion resistance, and greater heat resistance. A preferred range is from 2.5 to 10 parts by weight per 100 parts of elastomer. The improvement in tensile strength and abrasion resistance is completely unexpected since the compounding of any factice into a natural rubber stock normally results in lower tensile strength, and lower abrasion resistance.

The use of from 2 to 5 parts by weight of chlorinated paraffin per 100 parts of elastomer effects an improvement in the tensile strength of the cured elastomer and an improvement in its resistance to heat degradation. A preferred range is from 2 to 4 parts by weight while approximately 3 parts by weight of chlorinated paraffin is particularly useful. The degree of chlorination of the paraffin has an effect upon the amount of chlorinated paraffin used. The above ranges apply to paraffin which has been 40% chlorinated. Higher or lower chlorinated paraffins may be used in correspondingly smaller or larger amounts.

Polychloroprene, a synthetic rubber manufactured by E. I. Dupont de Nemours and Company under the name of neoprene, will produce similar beneficial effects upon the cured properties of the elastomer. Polychloroprene should be used in amounts ranging from 0.25 to 5 parts by weight per 100 parts of elastomer. A preferred range is from 1 to 5 parts while a particularly effective range is from 1 to 3 parts by weight of polychloroprene per 100 parts of elastomer.

Mixtures of white factice, chlorinated paraffin and polychloroprene may also be beneficially used in the compounding of these synthetic elastomers to effect an improvement in their properties.

The following tables show the results obtained by mixing white factice into the diisocyanate-modified polyesters. Amounts are shown as parts by weight. The term "Elastomer 1" denotes a diisocyanate-modified polyester prepared according to Example 2 above while "Elastomer 2" denotes a diisocyanate-modified polyester prepared according to Example 3 above, "Diisocyanate" denotes 4,4'-diphenylene diisocyanate.

TABLE I.—TENSILE AND ABRASION

| Recipe | 1 | 2 | 3 | 4 |
| --- | --- | --- | --- | --- |
| Elastomer 1 | 100.00 | 100.00 | | |
| Elastomer 2 | | | 100.00 | 100.00 |
| Diisocyanate | 6.62 | 6.62 | 6.50 | 6.50 |
| White Factice | | 5.00 | | 5.00 |
| Tensile (pounds/square inch) | 2,525 | 4,475 | 1,650 | 4,300 |
| Percent Elongation at break | 740 | 690 | 660 | 670 |
| Hardness, Shore "A" | 60 | 66 | 55 | 62 |
| Bureau of Standards Abrasion, Percent of Standard | 88 | 182 | 43 | 116 |

The test specimens were cured for fifteen minutes at 280° F., except for the abrasion samples in recipes 1 and 2 which were cured for thirty minutes at 280° F.

TABLE II.—THERMAL DEGRADATION

| Recipe | 5 | | 6 | |
| --- | --- | --- | --- | --- |
| Elastomer 2 | 100.00 | | 100.00 | |
| Diisocyanate | 6.58 | | 6.58 | |
| White Factice | | | 5.00 | |
| | Tensile (lbs./sq. in.) | Hardness (Shore, Type A) | Tensile (lbs./sq. in.) | Hardness (Shore, Type A) |
| Cure: | | | | |
| 5 mins./280° F | 1,250 | 52 | 4,100 | 56 |
| 10 mins./280° F | 1,100 | 51 | 4,550 | 57 |
| 20 mins./280° F | 975 | 47 | 3,700 | 54 |
| 30 mins./280° F | 900 | 45 | 3,250 | 52 |
| 15 mins./240° F | 1,125 | 48 | 4,075 | 56 |
| 15 mins./260° F | 1,225 | 51 | 3,625 | 54 |
| 15 mins./280° F | 900 | 48 | 3,850 | 55 |
| 15 mins./300° F | 900 | 44 | 4,500 | 55 |
| 15 mins./320° F | 225 | 37 | 3,500 | 53 |

Table III below presents results obtained using chlorinated paraffin and polychloroprene. The elastomer used was one prepared according to Example 3. The diisocyanate used for cure was 1,5 naphthalene diisocyanate. Amounts in the recipes are expressed in parts by weight.

TABLE III

| Recipe | 7 | 8 | 9 |
|---|---|---|---|
| Elastomer | 100.00 | 100.00 | 100.00 |
| Diisocyanate | 5.60 | 5.60 | 5.60 |
| Polychloroprene |  | 1.00 |  |
| Chlorinated paraffin |  |  | 5.00 |
| Tensile (pounds/sq. in.): |  |  |  |
| Cure 15 min./240° F | 3,000 | 3,850 | 3,225 |
| Cure 15 min./260° F | 3,100 | 4,500 | 4,050 |
| Cure 15 min./280° F | 3,250 | 4,200 | 4,400 |
| Hardness (Shore, Type A): |  |  |  |
| Cure 15 min./240° F | 55 | 56 | 55 |
| Cure 15 min./260° F | 55 | 56 | 55 |
| Cure 15 min./280° F | 58 | 56 | 56 |

A study of the test results shown in the above tables illustrates the improvements in physical properties of the elastomer obtained by compounding into the elastomer white factice, polychloroprene, and chlorinated paraffin.

This application is a continuation-in-part of my co-pending application Serial Number 206,709, filed January 18, 1951 now abandoned.

While certain representative embodiments and details have been shown for the purpose of illustrating the invention, it will be apparent to those skilled in this art that various changes and modifications may be made therein without departing from the spirit or scope of the invention.

I claim:

1. A composition of matter comprising from 0.50 to 30 parts by weight of white factice and 100 parts by weight of an elastomeric isocyanate-modified linear polyester selected from the group consisting of (A) the reaction product resulting from the reaction of a mixture comprising (1) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing amino groups being present in an amount not to exceed 7.5% of the total functional groups of said complementary bifunctional reactant, said material having a hydroxyl number from 40 to 100 and an acid number from 0 to 7, and (2) at least one diisocyanate selected from the group consisting of 4,4'-diphenyl diisocyanate; 4,4'-diphenylene methane diisocyanate; dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 mol per mol of said material; (B) the reaction product resulting from the reaction of a mixture comprising (3) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing groups being present in an amount not to exceed 30% of the total functional groups of said complementary bifunctional reactant, said material having a hydroxyl number from 30 to 140 and an acid number from 0 to 12, and (4) at least one tolylene diisocyanate used in an amount ranging from 0.85 to 1.10 mols per mol of said material; (C) the reaction product resulting from the reaction of a mixture comprising (5) a polyester prepared from bifunctional ingredients including at least one dibasic carboxylic acid containing at least three carbon atoms, and at least one glycol, said polyester having an hydroxyl number from 30 to 140 and an acid number from 0 to 12, (6) at least one bifunctional additive selected from the group consisting of diamines, amino alcohols, dicarboxylic acids, amino carboxylic acids, hydroxy carboxylic acids and the ureas, guanidines, and thioureas containing a primary amino group, said bifunctional additive being used in an amount such that the total number of —NH2 and —COOH equivalents present in said bifunctional reactant shall be from 0.06 to 0.24 equivalent per mol of polyester, and (7) at least one tolylene diisocyanate used in an amount equal to the sum of from 0.85 mol to 1.10 mols of diisocyanate per mol of polyester plus the molar amount of diisocyanate equivalent to the mols of said bifunctional additive used; (D) the reaction product resulting from the reaction of a mixture comprising (8) a polyester prepared from bifunctional ingredients including at least one dibasic carboxylic acid containing at least three carbon atoms and at least one glycol, said polyester having a hydroxyl number between 40 and 100 and an acid number from 0 to 7, (9) at least one bifunctional additive selected from the group consisting of diamines, amino alcohol, dicarboxylic acids, amino carboxylic acids, hydroxy carboxylic acids, and the ureas, guanidines and thioureas containing a primary amino group, said bifunctional additive being used in an amount such that the total number of —NH2 and —COOH equivalents present in said bifunctional reactant shall be from 0.06 to 0.48 equivalent per mol of polyester, and (10) at least one diisocyanate selected from the group consisting of 4,4'-diphenyl diisocyanate; 4,4'-diphenylene methane diisocyanate; 4,4'-tolidine diisocyanate; dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mol to 0.99 mol of diisocyanate per mol of polyester plus the molar amount of diisocyanate equivalent to the mols of bifunctional additive used (A) and (B) being reacted with a sufficient amount of at least one polyisocyanate to bring the total number of —NCO equivalents present in said composition to from 2.80 to 3.20 equivalents per mol of said material and (C) and (D) being reacted with a sufficient amount of at least one polyisocyanate to bring the total number of —NCO equivalents present in said composition to the sum of from 2.80 to 3.20 equivalents per mol of said polyester plus twice the molar amount of bifunctional additive used in the preparation of said elastomeric reaction product.

2. A composition defined by claim 1 in which (2) of (A) is 4,4'-diphenyl diisocyanate used in an amount ranging from 0.90 to 0.99 mols per mol of said material.

3. A composition defined by claim 1 in which (4) of (B) is tolylene diisocyanate used in an amount ranging from 0.90 to 1.00 mols per mol of said material.

4. A composition defined by claim 1 in which (7) of (C) is tolylene diisocyanate used in an amount equal to the sum of from 0.90 to 1.00 mols of diisocyanate per mol of polyester plus the molar amount of diisocyanate equivalent to the mols of said bifunctional additive used.

5. A composition defined by claim 1 in which (10) of (D) is 4,4'-diphenyl diisocyanate used in an amount equal to the sum of from 0.90 to 0.99 mols per mol of polyester plus the molar amount of diisocyanate equivalent to the mols of bifunctional additive used.

6. A composition defined by claim 1 in which (10) of (D) is 4,4'-tolidine diisocyanate used in an amount equal to the sum of from 0.90 to 0.99 mols per mol of polyester plus the molar amount of diisocyanate equivalent to the mols of bifunctional additive used.

(References on following page)

References Cited in the file of this patent

UNITED STATES PATENTS

| | | |
|---|---|---|
| 2,385,256 | Britton et al. | Sept. 18, 1945 |
| 2,424,885 | Buist et al. | July 29, 1947 |
| 2,431,921 | Cook et al. | Dec. 2, 1947 |
| 2,556,721 | Gislon et al. | June 21, 1951 |
| 2,591,884 | Simon et al. | Apr. 8, 1952 |
| 2,618,617 | Cadwell et al. | Nov. 18, 1952 |
| 2,623,031 | Snyder | Dec. 23, 1952 |
| 2,626,939 | Hoogsteen et al. | Jan. 27, 1953 |
| 2,643,238 | Crozier et al. | June 23, 1953 |

FOREIGN PATENTS

| | | |
|---|---|---|
| 644,829 | Great Britain | Oct. 18, 1950 |